(12) United States Patent
Ish et al.

(10) Patent No.: US 9,886,386 B2
(45) Date of Patent: Feb. 6, 2018

(54) SELF-ADJUSTING CACHING SYSTEM

(71) Applicant: Avago Technologies General IP (Singapore) Pte. Ltd, Singapore (SG)

(72) Inventors: Mark Ish, Atlanta, GA (US); Sumanesh Samanta, Bangalore (IN)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 1006 days.

(21) Appl. No.: 13/948,394

(22) Filed: Jul. 23, 2013

(65) Prior Publication Data

US 2015/0026403 A1    Jan. 22, 2015

Related U.S. Application Data

(60) Provisional application No. 61/847,657, filed on Jul. 18, 2013.

(51) Int. Cl.
*G06F 12/02* (2006.01)
*G06F 12/0868* (2016.01)
*G06F 17/18* (2006.01)
*G06F 11/34* (2006.01)

(52) U.S. Cl.
CPC .......... *G06F 12/0868* (2013.01); *G06F 11/34* (2013.01); *G06F 11/3409* (2013.01); *G06F 17/18* (2013.01); *G06F 2212/262* (2013.01)

(58) Field of Classification Search
CPC .. G06F 12/0868; G06F 11/3409; G06F 11/34; G06F 17/18; G06F 2212/262
See application file for complete search history.

(56) References Cited

U.S. PATENT DOCUMENTS

| | | | |
|---|---|---|---|
| 6,487,638 B2 | 11/2002 | Dawkins et al. | 711/133 |
| 2005/0060498 A1 | 3/2005 | Curtis | 711/134 |
| 2008/0005466 A1 | 1/2008 | Lubbers et al. | 711/113 |
| 2012/0110258 A1 | 5/2012 | Lakey et al. | 711/113 |
| 2012/0110259 A1 | 5/2012 | Mills et al. | 711/113 |
| 2012/0117324 A1* | 5/2012 | Solina, II | G06F 12/0871 711/118 |
| 2013/0054897 A1* | 2/2013 | Flemming | G06F 12/0888 711/122 |
| 2014/0223094 A1* | 8/2014 | Baderdinni | G06F 3/0689 711/114 |

* cited by examiner

*Primary Examiner* — Arpan P. Savla
(74) *Attorney, Agent, or Firm* — Sheridan Ross P.C.

(57) ABSTRACT

An apparatus having a cache and a controller is disclosed. The controller is configured to (i) gather a plurality of statistics corresponding to a plurality of requests made from one or more hosts to access a memory during an interval, (ii) store data of the requests selectively in the cache in response to a plurality of headers and (iii) adjust one or more parameters in the headers in response to the statistics. The requests and the parameters are recorded in the headers.

20 Claims, 9 Drawing Sheets

SELF-ADJUSTING CACHING SYSTEM

This application relates to U.S. Provisional Application No. 61/847,657, filed Jul. 18, 2013, which is hereby incorporated by reference in its entirety.

FIELD OF THE INVENTION

The invention relates to cache memories generally and, more particularly, to a method and/or apparatus for implementing a self-adjusting caching system.

BACKGROUND

Effective leveraging of solid-state disk drives as a data cache is dependent on accurate detection and retention of frequently accessed data. A challenging aspect is to find the frequently accessed data by observing only a stream of host commands coming to a controller of a redundant array of independent disks. Once detected, the data is loaded into the cache for higher performance on subsequent requests. However, if the data is infrequently accessed, cache space is wasted and performance is negatively impacted because loading the infrequently accessed data into the cache represents additional operations.

SUMMARY

The invention concerns an apparatus having a cache and a controller. The controller is configured to (i) gather a plurality of statistics corresponding to a plurality of requests made from one or more hosts to access a memory during an interval, (ii) store data of the requests selectively in the cache in response to a plurality of headers and (iii) adjust one or more parameters in the headers in response to the statistics. The requests and the parameters are recorded in the headers.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a self-adjusting caching system that may (i) provide weighted calculations of a heat index, (ii) give preference to one or multiple singular parameters in the system, (iii) operate either on a timer or on a number of executed input/output access requests, (iv) give different weights to different parameters based on an input/output stream analysis, (v) demote/promote windows among queues on a per window basis, (vi) calculate a different heat index for each window, (vii) balance inter-queue demotions to match inter-queue promotions, (viii) track of number of demotions per queue and/or (ix) be implemented as one or more integrated circuits.

Some embodiments provide self-adjustment of operational parameters and processes (or functions) in a caching system based on a statistical analysis run during each given interval. Cache data storage or bypass of a cache memory is based on statistical parameters. The caching is flexible in promotions and demotions of the cache data based on functions performed on each of the statistical parameters. The statistical parameters allow for preferences not only for spatial and temporal relationships of data, but can also be based on a nature of the input/output requests to read or write, a sequential relationship (or nature) of the accesses and/or ratios of reads to writes with a standard spatial and temporal nature of data.

The caching system is typically used in connection with a mass storage memory device (or circuit), such as a redundant array of independent disks (e.g., RAID). An address space of the memory circuit is divided into windows. Each window can be associated with none, one or more cache lines. Each window is tracked as an individual entity. To provide retention and replacement, the windows are organized into ascending priority queues that are double linked with a least-recently-used position at a head of the queue and a most-recently-used position being a last entry. Queue heads retain some of the heuristic parameters associated with the caching, such as a last time of access and the heat index. Each heat index is used as a priority index into the queues.

Figure 1:
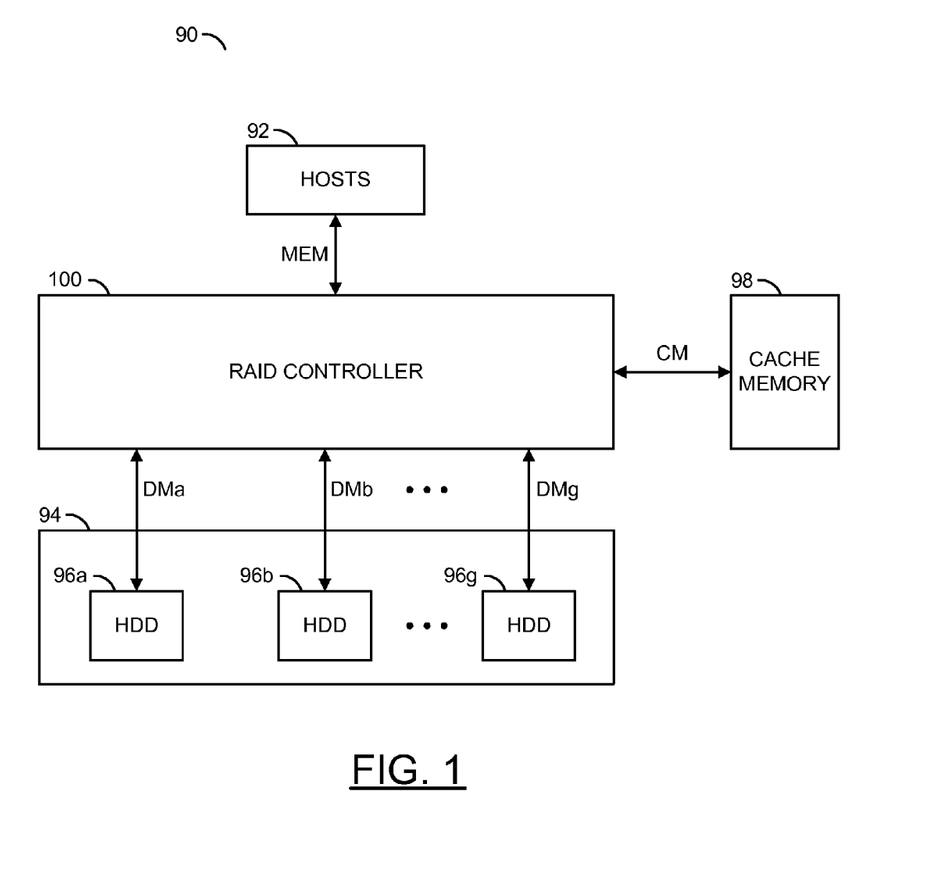
FIG. 1 is a block diagram of an apparatus.

Referring to FIG. 1, a block diagram of an apparatus 90 is shown. The apparatus (or system) 90 may implement a computer system having a self-adjusting caching system. The apparatus 90 generally comprises one or more blocks (or circuits) 92, a block (or circuit) 94, one or more blocks (or circuits) 96a-96g, a block (or circuit) 98 and a block (or circuit) 100. In some embodiments, the circuit 98 may part of the circuit 100. The circuits 92-100 may represent modules and/or blocks that may be implemented as hardware, software, a combination of hardware and software, or other implementations.

A memory signal (e.g., MEM) is shown exchanged between the circuit 92 and the circuit 100. A cache memory signal (e.g., CM) is shown exchanged between the circuit 100 and the circuit 98. The circuit 100 is shown exchanging disk memory signals (e.g., DMa-DMg) with the circuit 94 (e.g., the circuits 96a-96g).

The circuit 92 implements one or more host circuits. Each circuit 92 is operational to present access requests to the circuit 100 via the signal MEM. The access requests may include, but are not limited to, read access requests and write access requests. Each read access request includes a memory address from which data is to be read. Each write access request includes both data and a memory address at which the data is to be stored. The addresses may be in the form of logical block addresses (e.g., LBAs). Other addressing schemes may be implemented to meet the criteria of a particular application.

The circuit 94 implements a memory circuit (or mass storage device). The circuit 94 is operational to store data written by the circuit 100 and present data read by the circuit 100. The circuit 94 may be configured to operate in a RAID 0, RAID 1, RAID 2, RAID 3, RAID 4, RAID 5, RAID 6, RAID 0+1, RAID 1+0 and/or RAID 5+1 configurations. In some embodiments, the circuit 94 is configure to operate as one or more virtual disks (or virtual memories).

Each circuit 96a-96g implements a storage drive. The circuits 96a-96g are operational to store data for the circuit 92. The data is received from the circuit 100 and sent to the circuit 100 via the respective signals DMa-DMg. Collectively, the circuits 96a-96g form a mass storage device. A common size of the mass storage device ranges from a several terabytes to a few petabytes. In some embodiments, the mass storage device is arranged as one or more virtual devices (or virtual disks), as seen from the circuit 92. In some embodiments, the circuits 96a-96g are all implemented with the same technology. In other embodiments, the circuit 96a-96g are implemented with a mixture of technologies. The technologies may include, but are not limited to, magnetic disk drives, optical drives, electro-magneto drives, solid-state (e.g., flash) drives and tape drives. Other drive technologies may be implemented to meet the criteria of a particular application.

The circuit 98 implements a cache memory circuit. The circuit 98 is operational to buffer data received from the circuit 100 via the signal CM. The buffered data is arranged as multiple cache lines. The data in the cache lines is transferred to the circuit 100 via the signal CM. In some embodiments, the circuit 98 is implemented as a solid-state drive. Common sizes of a solid-state drive range from 1 to 2 terabytes. In other embodiments, the circuit 98 is implemented as a double data rate memory circuit. Common sizes of a double data rate memory range from 1 to 64 gigabytes.

The circuit 100 may implement a redundant array of independent disks controller circuit. The circuit 100 is generally operational to process the access requests received via the signal MEM to store and read data to and from the circuit 94 (e.g., the circuits 96a-96g). The circuit 100 includes cache operations using either an internal cache memory or the circuit 98. The cache operations include generating an access (or trace) history of all access requests received from the circuit 92. The circuit 100 gathers statistics corresponding to the access requests made from one or more circuit 92 to access the circuit 94 during an interval. The data of the access requests is stored selectively in the cache in response to a plurality of headers. One or more parameters in the headers are adjusted at an end of each interval in response to the statistics. The access requests and the parameters are recorded in the corresponding headers. The window headers divide an address space of the circuit 94 into a plurality of windows. Each window generally has a plurality of subwindows. Each subwindow is sized to match a cache line in the cache. Each subwindow corresponds to one or more of the addresses.

Figure 2:
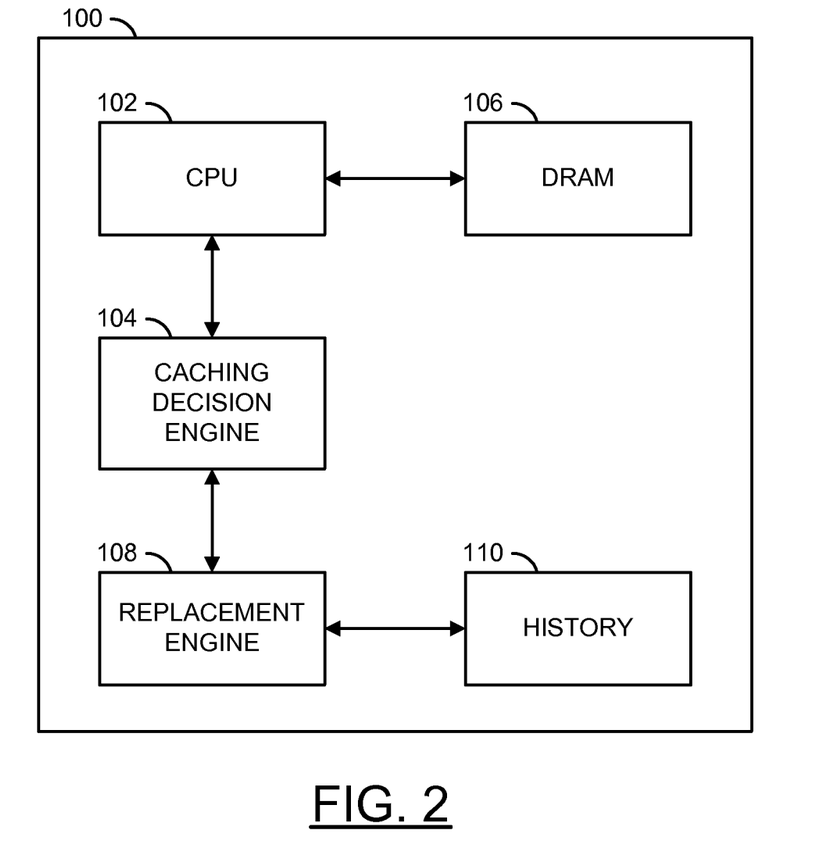
FIG. 2 is a block diagram of a controller circuit of the apparatus in accordance with an embodiment of the invention.

Referring to FIG. 2, a block diagram of an example implementation of the circuit 100 is shown in accordance with an embodiment of the invention. The circuit (or apparatus or device or integrated circuit) 100 generally comprises a block (or circuit) 102, a block (or circuit) 104, a block (or circuit) 106, a block (or circuit) 108 and a block (or circuit) 110. The circuits 102-110 may represent modules and/or blocks that may be implemented as hardware, software, a combination of hardware and software, or other implementations.

The circuit 102 implements a processor circuit. The circuit 102 is operational to control overall operations for the circuit 100. The circuit 102 executes software (or firmware or code or programming instructions) to move data between the circuit 92, the circuit 94 and/or the circuit 98.

The circuit 104 implements a caching decision engine. The circuit 104 is operational to determine which data is stored (or copied) into the cache (e.g., the circuit 98 and/or the circuit 106) and which data bypasses the cache. The determination is based on the statistical parameters generated by the circuit 102.

The circuit 106 implements a dynamic random access memory (e.g., DRAM) circuit. The circuit 106 is operational to store the window headers (e.g., access histories) generated by the circuit 100. In some embodiments, the circuit 106 also implements a cache memory used to cache data in transit to and from the circuit 94.

The circuit 108 implements a replacement module. The circuit 108 is operational to determine (i) when and which sets of data should be stored in the cache (e.g., the circuit 98 and/or the circuit 106) and (ii) when and which sets of data should be removed from in the cache. A store/remove (replacement) decision implemented by the circuit 108 utilizes the access history. Generally, hot (e.g., frequently accessed) data identified by the access history is usually populated in the cache. Cool (e.g., infrequently access) data may be kept out of the cache to avoid performance penalties incurred by moving the infrequent data into the cache. Standard replacement decision techniques generally include, but are not limited to, a least recently used replacement policy, a not frequently used replacement policy and an aging replacement policy. Other replacement decision policies may be implemented to meet the criteria of a particular application.

The circuit 110 implements a history module. The circuit 110 is operational to create the access histories from the access requests received from the circuit 92. The circuit 110 generates the access histories by mapping the address space of the circuit 94 into a fixed size granularity called windows (or extents). Each window tracks a granularity-sized portion of host space accesses. An additional granularity underneath each window is referred to as a subwindow (or subwindow extent). Each subwindow is associated with one or more addresses (e.g., logical block addresses). Each subwindow also represents (or matches) a cache line granularity. At different times, the various windows and subwindows may or may not be associated with data in the actual cache. Windows without any associated cache data are referred to as virtual window headers.

Many more window headers are commonly allocated across the address space of the circuit 94 than exists in the physical cache. Covering the address space of the circuit 94 generally allows for large regions of host accesses to be tracked although the cache is not involved in many host accesses. The access histories generally provide detailed information about host access patterns.

Figure 3:
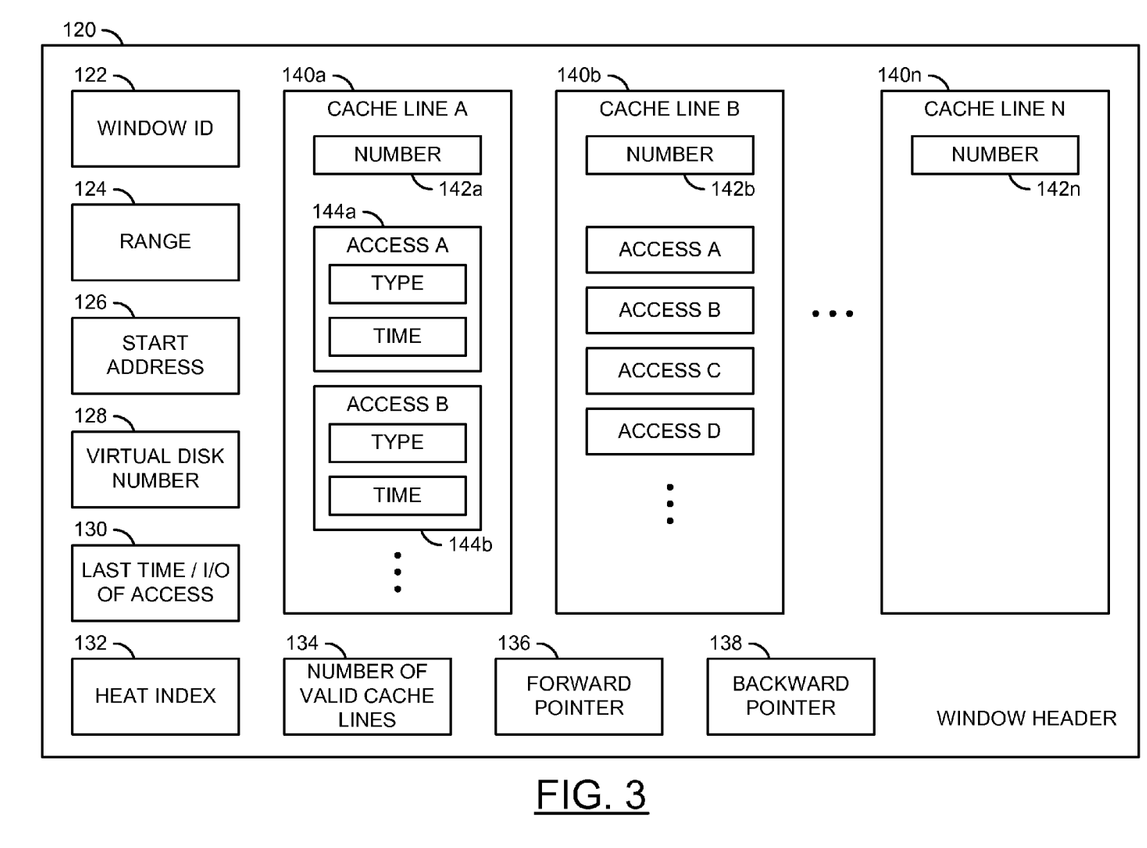
FIG. 3 is a diagram of a window header.

Referring to FIG. 3, a diagram of an example implementation of a window header 120 is shown. The window header 120 is generated by the circuit 110 and stored in the circuit 106. Each window header 120 is shown including a parameter (or field) 122, a parameter (or field) 124, a parameter (or field) 126, a parameter (or field) 128, a parameter (or field) 130, a parameter (or field) 132, a parameter (or field) 134, a parameter (or field) 136, a parameter (or field) 138, and multiple parameters (or fields) 140a-140n. Each window header 120 has a fixed size that spans a fixed amount (e.g., 1 megabyte of data or 2048 logical block addresses at 512 bytes/block) of the address space of the circuit 94. Other sizes of the window headers 120 may be implemented to meet the criteria of a particular application. A size of each window header 120 may be a power of 2 such that the headers are easily shifted and/or aligned in memory (e.g., circuit 106). Adjoining windows do not overlap.

The field 122 implements a window identity field. The field 122 provides a unique identifier of the corresponding window header 120 to allow the circuit 110 to distinguish among the various window headers 120.

The field 124 implements a range field. The field 124 generally defines a range of addresses (e.g., logical block addresses) covered by the corresponding window header 120.

The field 126 implements a start address field. The field 126 establishes a starting address (e.g., a particular logical block address) of the corresponding window header 120.

The field 128 implements a virtual disk number field. The field 128 stores an identification number of a virtual disk for which the window header 120 is established.

The field 130 implements a last time or last input/output of access field. The field 130 records the last access of an address covered by the window header 120.

The field 132 implements a heat index field. The field 132 records a heat value that identifies how hot or cool the access requests associated with the window header 120 have been during an interval.

The field 134 implements a number of valid cache lines field. The field 134 identifies how may cache lines associated with the window header 120 contain valid data. Virtual window headers just count line hits as no physical cache is associated with the virtual window headers.

The field 136 implements a forward pointer field. The field 136 points forward to a next window header or queue header.

The field 138 implements a backward pointer field. The field 136 points back to a previous window header or the queue header.

Each field 140a-140n implements a subwindow field. Each field 140a-140n stores a corresponding count number field 142a-142n and zero to several elements 144a-144b. Each field 140a-140n represents a portion of the address space of the circuit 94. Adjoining subwindows do not overlap. Each field 140a-140n also matches a cache line in terms of size. For example, if a cache line holds data for N addresses (e.g., 32 logical block addresses), each field 140a-140n covers an address space of the N addresses.

Each field 142a-142n implements a count field. Each field 142a-142n stores a count of the number of access requests made by the circuit 92 into the address range covered by the corresponding field (subwindow) 140a-140n. In some embodiments, the count is a running count of all access requests. In other embodiments, the count is a limited count of the number of access requests made within a given time frame (e.g., 0.1 seconds, 1 second, 1 minute, etc.) or the interval.

Each element 144a-144b implements an access element (or indicator). For each access request received by the circuit 100, an element 144a-144b is generated in the appropriate field 140a-140n of the subwindow corresponding to the memory address received in the access request. When created, each element 144a-144b includes a type of the access request (e.g., a read access or a write access) and a time that the access request was received by the circuit 100. Every host access request generates a cache window header access element 144a-144b regardless of whether or not the cache is populated for the access request (e.g., independent of a cache hit or a cache miss). The various fields 140a-140n in each window header 120 may have different numbers of the elements 144a-144b in response to the number and locations (e.g., addresses) of the access requests.

Figure 4:
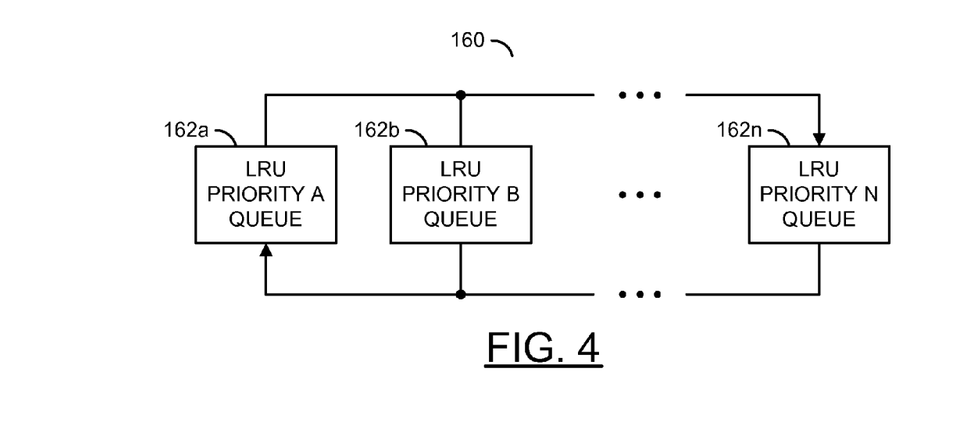
FIG. 4 is a block diagram of multiple priority queues.

Referring to FIG. 4, a block diagram of an example arrangement 160 of multiple priority queues 162a-162n is shown. he priority queues 162a-162n are arranged in an order of priority. In the example, the priority queue 162a has a lowest priority (e.g., first to have data evicted from the cache) and the priority queue 162n has a highest priority. During inter-queue promotions, a window header 120 will be moved from a current priority queue (e.g., the priority queue 162a) to a next higher priority queue (e.g., the priority queue 162b). The moved window header 120 is appended (e.g., attached to an end) to the new queue. During inter-queue demotions, a window header 120 will be prepended (e.g., attached to a front) to the new queue. Any number of the priority queues 162a-162n (e.g., 3-20) are generally implemented.

Figure 5:
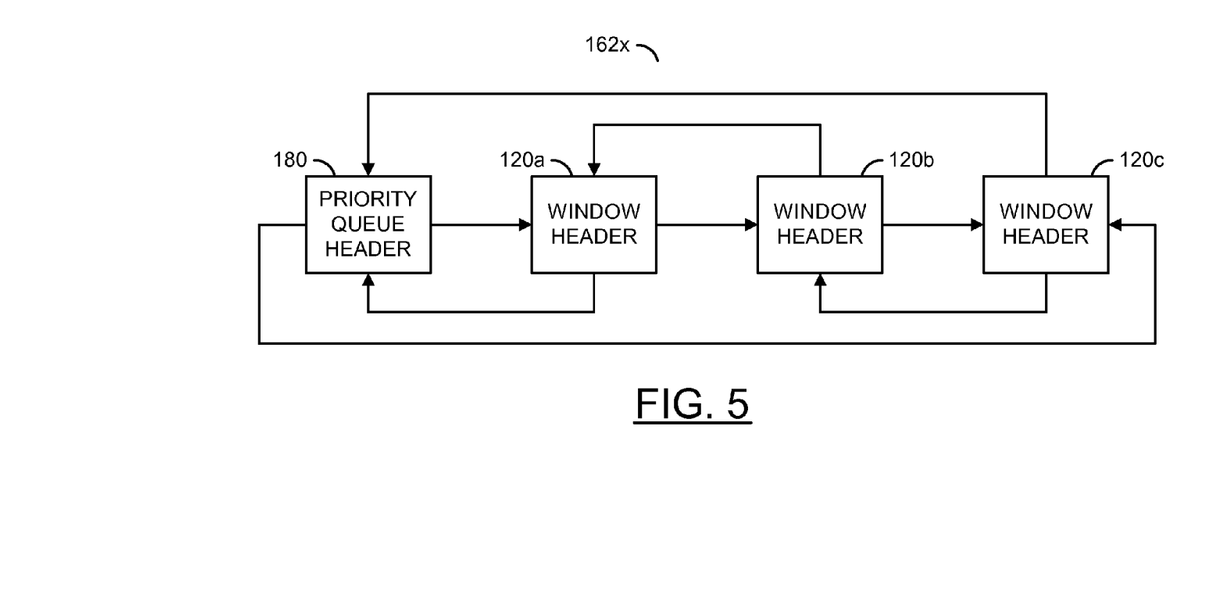
FIG. 5 is a block diagram of window headers within a priority queue.

Referring to FIG. 5, a block diagram of an example arrangement of window headers 120a-120c within a priority queue 162x is shown. The priority queue 162x is representative of the priority queues 162a-16n. The priority queue 162x is represented by a header 180 that contains a pointer to a first element (e.g., a window header), a pointer to a last element (e.g., a window header), a number of demotions in a current interval, a minimum heat index value in order to be promoted to the queue 162x (e.g., a promotion value), an interval value (e.g., either time or an input/output access request count) and minimum number of demotions value (or threshold).

Multiple window headers 120a-120c are illustrated arranged in ascending order. The window header 120a is shown in a least recently used (or lowest) position. The window header 120c is shown in a most recently used (or highest) position. The window headers 120a-120c and the header 180 of the priority queue 162x are connected as a doubly linked list.

Figure 6:
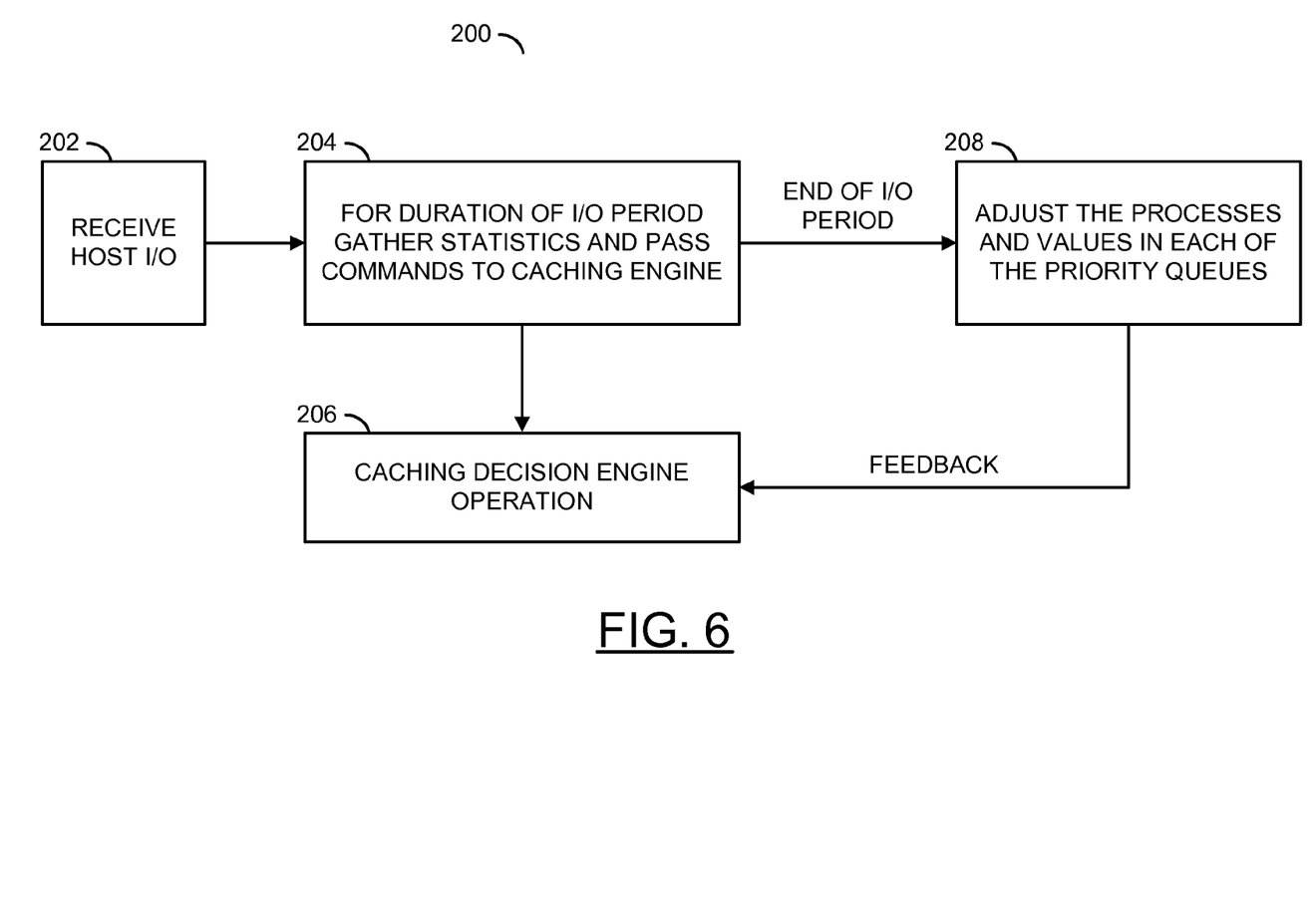
FIG. 6 is a flow diagram for a self-adjusting feedback loop.

Referring to FIG. 6, a flow diagram of an example method 200 of a self-adjusting feedback loop is shown. The method (or process) 200 is implemented by the circuit 100. The method 200 generally comprises a step (or state) 202, a step (or state) 204, a step (or state) 206 and a step (or state) 208. The steps 202-208 may represent modules and/or blocks that may be implemented as hardware, software, a combination of hardware and software, or other implementations.

In the step 202, one or more access requests are received by the circuit 100 from the circuit 92. For the duration of an interval (e.g., a period of time or a number of input/output requests), the circuit 102 gathers statistics and passes commands to the circuit 104. The circuit 104 performs caching decision operations in the step 206. The caching decisions are based on the statistical data. At an end of the interval, the circuit 100 adjusts the techniques and parameter values in each of the priority queues 162a-162n. The adjusted techniques and the adjusted parameters are feed back to the circuit 104 to future caching decision operations.

Each window header 120 is initialized with a coldest heat index value (e.g., zero). Each priority queue 162a-162n has an individual promotion setting. Each promotion setting in each lower priority queue 162a-162n has a lower value than a neighboring higher priority queue 162a-162n.

The heat index value of a window 120 is calculated in the step 208 at the end of each interval per formula 1 as follows:

$$\text{Heat Index} \mathrel{+}= (F1(IO \text{ type, read or write}) + F2(\text{Additional cache lines valid}))/F3(\text{Timer or IO count difference since last access}) \qquad (1)$$

The function F1 allows the type of input/output (e.g., IO) access requests to be weighted in each window versus a function F3 of time or number of input/output access requests until a next access request is received by the circuit 100. The function F2 is based on a number of additional cache lines that become valid during the interval.

A demotion formula of the heat index value is calculated per formula 2 as follows:

$$\text{New Heat Index} = \text{Current Heat Index}/F3(\text{Time or IO count difference}) \quad (2)$$

If the new heat index value is less than the current heat index value, the window header 120 is demoted.

The heat index value is generally calculated on each input/output access request of the corresponding window header 120. If the heat index value of a given window header 120 exceeds the promotion value of the next highest priority queue 162a-162n, the given window header 120 is removed from the current priority queue 162a-162n and appended to the (new) next highest priority queue 162a-162n.

After completion of the promotion, the least recently used window header 120 in the new priority queue 162a-162n is examined and demoted, if possible. If the least recently used window header 120 is demoted, a counter for a number of demoted windows is incremented.

After the interval has expired, the step 208 includes examining the counter for the number of demotions in each priority queue 162a-162n. Where the counter for the number of demotions is less than the minimum number of demotions for a given priority queue 162a-162n, one or more window headers 120 are demoted until the counter matches the minimum number of demotions threshold. The counter for the number of demotions is reset to zero for each priority queue 162a-162n once all of the demotions for the just-completed interval have been made. The heat index value in the least recently used (virtual) window header 120 in the lowest priority queue 162a is subsequently examined to see if new data can be brought into the cache or not for the virtual window header 120.

During the step 208, the techniques for adjusting the parameters in the window headers 120 are also modified. Several examples include, but are not limited to the following modifications. If highly repetitive access requests are detected such that one access request is followed by several in the same window header (or extent region) 120, the criteria for promotion from the lowest priority queue 162a (e.g., promotion from virtual to physical cache) can be adjusted to a point where an initial access can be stored in the physical cache.

In another example, if the access requests are highly spatially related (e.g., in a small band of logical block address ranges), the spatial portion of the heat index function (e.g., F2) is increased. Therefore, an addition of a valid cache line in the window will increase the heat index value disproportionately to number or type of access requests.

Upon detection that every write type access request is followed by several read type access requests in the same logical block address range, the value of the writes in the type of input/output heat index function (e.g., F1) is increased so that the initial write access is cached, but possibly not in an initial read access.

The ratios of write accesses to read accesses can be examined in another value. Based on the ratios, a flushing process can be adjusted to accommodate an availability of replacement window headers.

In another example, a sequential nature of access requests are detected. In response to the nature, the step 208 determines whether to perform a read ahead or a write behind between the cache and the circuit 94.

Generally, the window headers 120 are dealt with in terms of the intervals. The heat index formula allows weighting of the input/output access requests, an amount of spatial data and an amount of temporal data separately. Adjustments per each aspect of the formula are possible. In some embodiments, preferences are given to spatial relationships (e.g., number of valid lines). In other embodiments, preferences are given to either read requests or to write requests. The promotional scheme could be made nonuniform, where different values are applied to different levels of priority. The demotion of a window header for each promotion of a window header achieves balance in terms of overall window header availability for replacement. The methods and techniques will also work with elastic caches and virtual caches. Additional priority queues can be set up to reflect different aspects of behavior. For example, one or more priority queues can be established for dirty data to determine flush priority. One or more priority queues could also be established for a physical drive for proper distribution for mirror windows in an elastic cache implementation.

Figure 7:
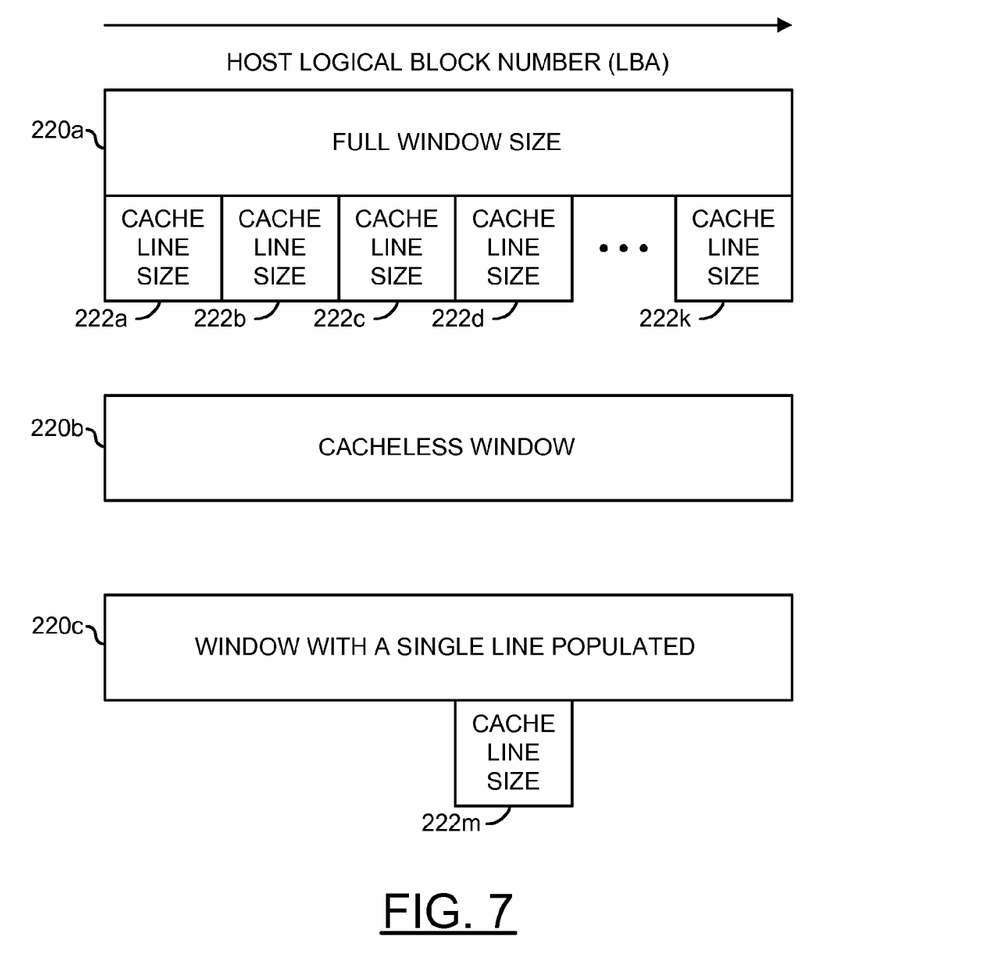
FIG. 7 is a block diagram of multiple window headers relative to multiple cache lines.

Referring to FIG. 7, a block diagram of example multiple window headers 220a-220c relative to multiple cache lines is shown. The block diagram generally illustrates relationships between a window size granularity and a cache granularity. Each window header 220a-220c is representative of the window header 120. The example window header 220a generally illustrates a full header. All of the subwindow fields 140a-140n (FIG. 3) in the window header 220a correspond to addresses that are currently buffered in respective cache lines 222a-222k of the cache. Therefore, any access request initiated by the circuit 92 into the address space covered by the window header 220a results in a cache hit.

The example window header 220b generally illustrates an empty header. None of the subwindow fields 140a-140n (FIG. 3) in the window header 220b correspond to an address that is currently buffered in the cache. The window header 220b is not backed by the physical cache so the window header 220b is referred to as a virtual window header. All access requests initiated by the circuit 92 into the address space covered by the virtual window header 220b result in a cache miss.

The example window header 220c generally illustrates a partially full header. Some subwindow fields 140a-140n (e.g., a single subwindow in the example) correspond to an address that is currently buffered in the cache line 222m. The other subwindow fields 140a-140n correspond to addresses not currently buffered in the cache. As such, some access requests initiated by the circuit 92 into the window 220c result in a cache hit and other access requests result in a cache miss.

Figure 8:
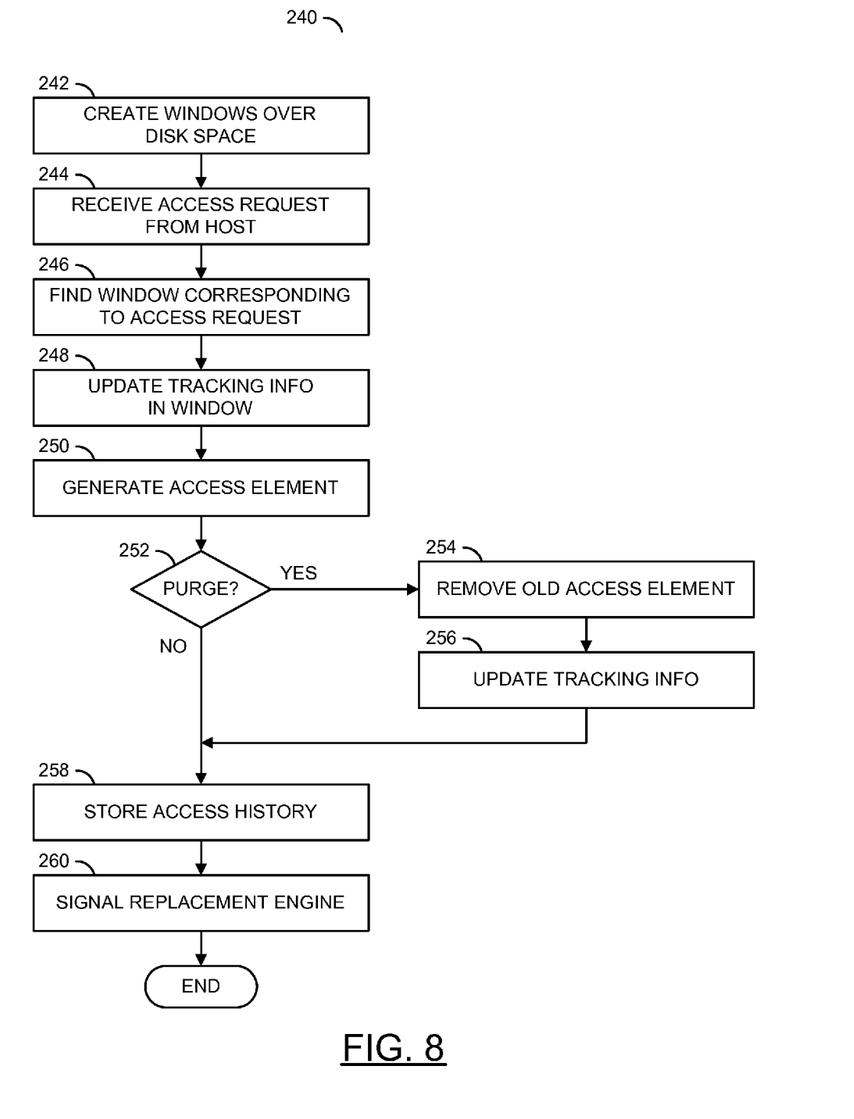
FIG. 8 is a flow diagram for updating access history.

Referring to FIG. 8, a flow diagram of an example method 240 for updating the access history is shown. The method (or process) 240 is implemented by the circuit 100. The method 240 generally comprises a step (or state) 242, a step (or state) 244, a step (or state) 246, a step (or state) 248, a step (or state) 250, a step (or state) 252, a step (or state) 254, a step (or state) 256, a step (or state) 258 and a step (or state) 260. The steps 242-260 may represent modules and/or blocks that may be implemented as hardware, software, a combination of hardware and software, or other implementations.

In the step 242, the circuit 110 creates multiple window headers that divide the address space of the circuit 94 or the resulting virtual disks. Each window header generally represents a portion of the address space. In some embodiments, the entire address space is covered by the window headers. In other embodiments, a subset of the address space are covered by the window headers at any given time.

In the step 244, the circuit 100 receives an access request from the circuit 92. The access request is presented to the circuit 110 to determine which window header and which subwindow is associated with the memory address (e.g., logical block address) received in the access request per the step 246. In situations where the circuit 92 is implemented as two or more hosts, an identify of the sending host is disregarded for purposes of the tracking information. If a new window is created for tracking the access request, an oldest virtual window header (e.g., the least recently used virtual window header) is examined and reused if the oldest virtual window header is not determined to be useful anymore.

The tracking information (e.g., the count number) in the subwindow associated with the received memory address is updated in the step 248 by the circuit 110. Updating the tracking information includes creating a new element in the associated subwindow to record the access request in the step 250. The element indicates the type of access request and the time at which the access request was received.

In the step 252, the circuit 110 determines if one or more older elements should be purged from the associated subwindow and/or window header. A variety of techniques may be used to determine when to purge and when not to purge an old element. For example, any element created more than a set amount of time before the current time is considered stale and thus should be removed. In another example, if the newly added element fills the capacity of the subwindow, the oldest element is removed (e.g., first in first out). Other purge techniques may be implemented to meet the criteria of a particular application. Once the older elements have been removed in the step 254, the tracking information (e.g., count number) of the subwindow is updated by the circuit 110 in the step 256. The method 240 continues with the step 258.

If no elements should be removed, or purging of elements is not implemented by a particular application, the circuit 110 stores the updated access (trace) history in the circuit 106 per the step 258. The circuit 110 signals the circuit 108 in the step 260 that the updated access history has been posted. Once the circuit 110 has signaled to the circuit 108, the method 240 ends and wait for the next access request from the circuit 92.

Figure 9:
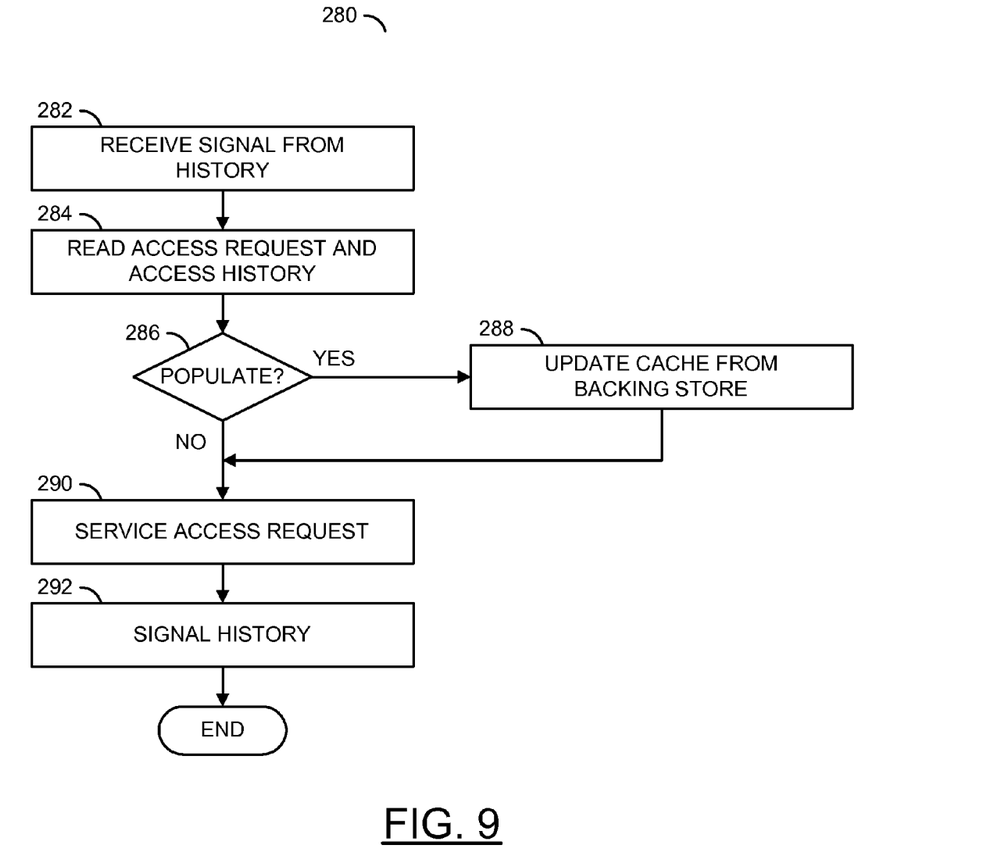
FIG. 9 is a flow diagram for updating a cache.

Referring to FIG. 9, a flow diagram of an example method 280 for updating the cache is shown. The method (or process) 280 is implemented by the circuit 100. The method 280 generally comprises a step (or state) 282, a step (or state) 284, a step (or state) 286, a step (or state) 288, a step (or state) 290 and a step (or state) 292. The steps 282-292 may represent modules and/or blocks that may be implemented as hardware, software, a combination of hardware and software, or other implementations.

In the step 282, the circuit 108 receives the signal from the circuit 110 indicating that the updated access history is available in the circuit 106. The circuit 108 reads the access history and the received access request in the step 284. In the step 286, the circuit 108 determine if one or more cache lines should be populated from the circuit 94 in response to the access request. The determination may be made, at least in part, based on the tracking information available in the corresponding window header and subwindow. For example, if the tracking information shows that a recent number of access requests to the corresponding subwindow exceeds a threshold count, a flag is raised. The replacement policy implemented by the circuit 108 thus concludes that the cache should be populated due to the access request and the access history. Other replacement policies may be implemented to meet the criteria of the particular application.

Where the replacement policy decides to populate the cache in response to the access request, the circuit 108 copies a cache line containing the requested memory address from the circuits 96a-96g to the cache in the step 288. The method 280 continue with the step 290.

Where the replacement policy decides not to populate the cache, the requested memory address is already available in the cache (e.g., a cache hit) or the requested data was recently retrieved from the circuit 94 (e.g., step 288), the circuit 108 services the access request in the step 290. In the step 292, the circuit 108 signals to the circuit 110 the results of the replacement policy.

Figure 10:
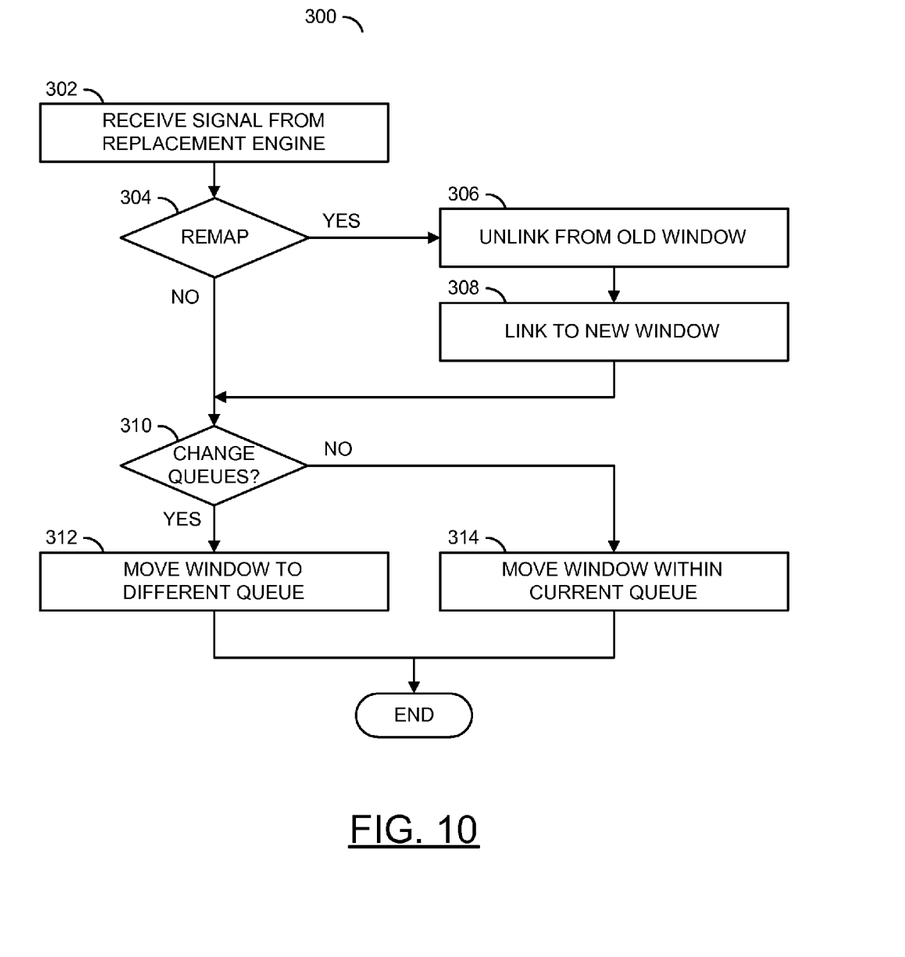
FIG. 10 is a flow diagram for updating the window headers.

Referring to FIG. 10, a flow diagram of an example method 300 for updating the window headers is shown. The method (or process) 300 may be implemented by the circuit 100. The method 300 generally comprises a step (or state) 302, a step (or state) 304, a step (or state) 306, a step (or state) 308, a step (or state) 310, a step (or state) 312 and a step (or state) 314. The steps 302-314 may represent modules and/or blocks that may be implemented as hardware, software, a combination of hardware and software, or other implementations.

In the step 302, the circuit 110 receives the signal from the circuit 108 indicating that the access request has been serviced. The circuit 110 considers if one or more cache lines were populated or not from the circuit 94 while servicing the access request in the step 304. If old data in the cache lines was replaced by new data from the circuit 94, the circuit 110 remaps links for the cache lines from the old window headers to the new window headers. In the step 306, the circuit 110 unlinks the cache lines from the old window headers that corresponds to the old data (or memory addresses) removed from the cache. In the step 308, the circuit 110 links the cache lines to the new window headers that cover the new data (or memory addresses) copied into the cache. The method 300 may continue with the step 310.

If no remapping was performed or if some cache lines were changed while servicing the access request, the circuit 110 determines in the step 310 if any of the window headers should be changed between two or more priority queues (or lists). Consider by way of example a virtual window header (e.g., 220b) that had no links to the actual cache lines before the access request. Such a virtual window header is stored in a cacheless-type priority queue (e.g., 162a). If servicing the request causes the virtual window header to acquire one or more links to one or more cache lines, the circuit 110 moves (or promotes) the window header from the cacheless-type queue to a cached-type queue in the step 312. Likewise, if servicing the access request breaks all links between a window header in the cached-type queue, the circuit 110 moves (or demotes) the window header into a most recently used position in the cacheless-type queue in the step 312.

If servicing the access request does not pull the window header from the cacheless-type queue or move the window header into the cacheless-type queue, the circuit 110 moves the window header within a current queue (e.g., the cacheless-type queue or the cached-type queue) in the step 314. For example, the window header spanning the address space of the just-serviced access request is moved to a most recently used position in the current queue. Once the window headers are properly placed in the proper queues, the method 300 ends and waits for the next access request from the circuit 92.

Embodiments of the invention generally provide flexible functions that can provided weighted calculation of the heat index values. The weights give preference to one or multiple singular parameters in the system (e.g., reads versus writes, number of valid lines in the window, sequential versus random patterns, read/write mix etc.) The system can operate based on either a timer or a number of executed access requests. The interval parameter is kept on a per window basis. The functions used to calculate the heat indexes can be adjusted (e.g., given different weight to different parameters) based on an input/output stream analysis done by the system. Demotions/promotions are performed on per window bases, with each window having an independent heat index calculated. A balanced approach to the demotion/promotion can be implemented with one window being possibly demoted for each window being promoted. The system also keeps track of the number of demotions per priority queue. If some queues did not demote enough windows during a given interval, at expiration of the interval, one or more windows are demoted from such queues.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a cache; and
   a controller to (i) gather a plurality of statistics corresponding to a plurality of requests made from one or more hosts to access a memory during an interval, (ii) store data of said requests selectively in said cache in response to a plurality of headers and (iii) adjust one or more parameters in said headers in response to said statistics, wherein said requests and said parameters are recorded in said headers,
   wherein the one or more parameters includes a heat index value for each of said headers,
   wherein the heat index value indicates how hot or cool said requests associated with said headers have been during the interval,
   wherein the controller links each of said headers to a corresponding one of a plurality of queues,
   wherein each of said queues represents a different one of a plurality of priorities to store said data in said cache, and
   wherein the controller promotes said headers from the current priority queue to a next highest priority queue if a new index value exceeds a promotion value of the next highest priority queue.

2. The apparatus according to claim 1, wherein said controller moves one or more of said headers between said queues based on said parameters as adjusted.

3. The apparatus according to claim 1, wherein said controller demotes one or more of said headers from a first of said queues to a second of said queues at an end of said interval where a number of said headers in said first queue that have been demoted based on said parameters is less than a threshold.

4. The apparatus according to claim 1, wherein said statistics are at least one of one or more repetitive relationships among said requests, one or more spatial relationships among said requests, a write type of said requests followed by a plurality of read types of said requests, a ratio of said read types of said requests to said write types of said requests, and one or more sequential relationships among said requests.

5. The apparatus according to claim 1, wherein said headers divide an address space of said memory into a plurality of windows, each of said windows has a plurality of subwindows, and each of said subwindows is sized to match one of a plurality of cache lines in said cache.

6. The apparatus according to claim 1, wherein said apparatus is implemented as one or more integrated circuits.

7. A method for self-adjustment in a caching system, comprising the steps of:
gathering a plurality of statistics corresponding to a plurality of requests made from one or more hosts to access a memory during an interval;
storing data of said requests selectively in a cache in response to a plurality of headers;
adjusting one or more parameters in said headers in response to said statistics, wherein said requests and said parameters are recorded in said headers;
linking each of said headers to a corresponding one of a plurality of queues,
wherein the one or more parameters includes a heat index value for each of said headers,
wherein the heat index value indicates how hot or cool said requests associated with said headers have been during the interval, and
wherein each of said queues represents a different one of a plurality of priorities to store said data in said cache; and
demoting said headers from a current priority queue if a new heat index value is less than a current heat index value.

8. The method according to claim 7, further comprising the step of:
promoting one or more of said headers between said queues based on said parameters as adjusted.

9. The method according to claim 7, wherein the demoting demotes such that a number of said headers in said current priority queue that have been demoted is less than a threshold.

10. The method according to claim 7, wherein said statistics are at least one of one or more repetitive relationships among said requests, one or more spatial relationships among said requests, a write type of said requests followed by a plurality of read types of said requests, a ratio of said read types of said requests to said write types of said requests, and one or more sequential relationships among said requests.

11. The method according to claim 7, wherein said headers divide an address space of said memory into a plurality of windows, each of said windows has a plurality of subwindows, and each of said subwindows is sized to match one of a plurality of cache lines in said cache.

12. A controller comprising instructions that enable the controller to:
gather a plurality of statistics corresponding to a plurality of requests made from one or more hosts to access a memory during an interval;
store data of said requests selectively in a cache in response to a plurality of headers; and
adjust one or more weights of one or more parameters in said headers in response to said statistics based on a type of said requests, a number of cache lines in said cache that are valid, and a size of said interval since a previous one of said requests, wherein said requests and said parameters are recorded in said headers;
link each of said headers to a corresponding one of a plurality of queues,
wherein each of said queues represents a different one of a plurality of priorities to store said data in said cache,
wherein the one or more parameters includes a heat index value for each of said headers, and
wherein the heat index value indicates how hot or cool said requests associated with said headers have been during the interval; and
demote said headers from a current priority queue if a new heat index value is less than a current heat index value.

13. The apparatus according to claim 1, wherein the controller initializes each of said headers with a coldest heat index value.

14. The apparatus according to claim 1, wherein the controller updates the heat index value of each of said headers at the end of the interval.

15. The apparatus according to claim 1, wherein the controller demotes said headers from a current priority queue if a new heat index value is less than a current heat index value.

16. The apparatus according to claim 15, wherein the controller demotes said headers until a number of demotions in the current priority queue matches a threshold.

17. The controller according to claim 12, wherein the instructions enable said controller to demote said headers until a number of demotions in the current priority queue matches a threshold.

18. The controller according to claim 12, wherein the instructions enable said controller to update the heat index value of each of said headers at the end of the interval.

19. The controller according to claim 12, wherein said statistics are at least one of one or more repetitive relationships among said requests, one or more spatial relationships among said requests, a write type of said requests followed by a plurality of read types of said requests, a ratio of said read types of said requests to said write types of said requests, and one or more sequential relationships among said requests.

20. The controller according to claim 12, wherein said headers divide an address space of said memory into a plurality of windows, each of said windows has a plurality of subwindows, and each of said subwindows is sized to match one of a plurality of cache lines in said cache.

* * * * *